O. SMITH.
GUARD FOR WHEELS.
APPLICATION FILED MAY 14, 1913.
1,130,207.
Patented Mar. 2, 1915.
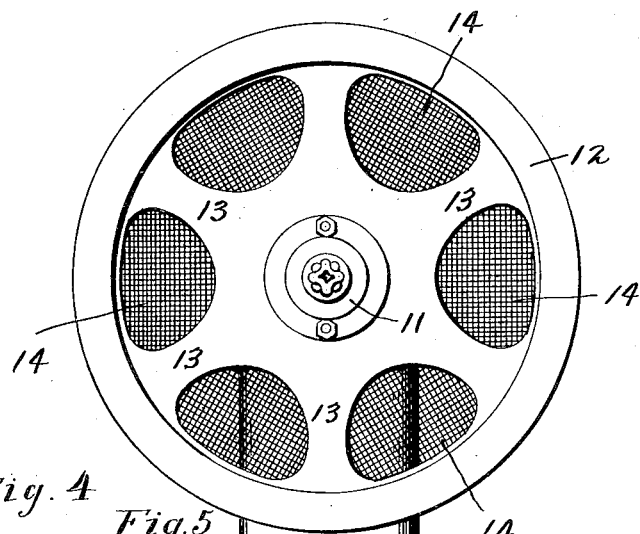
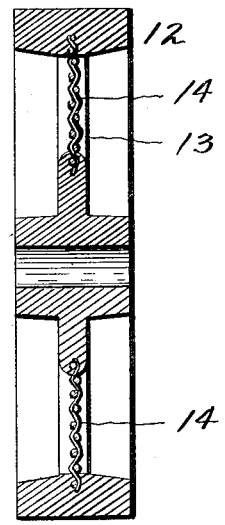
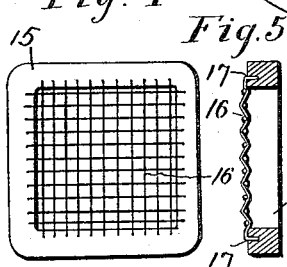
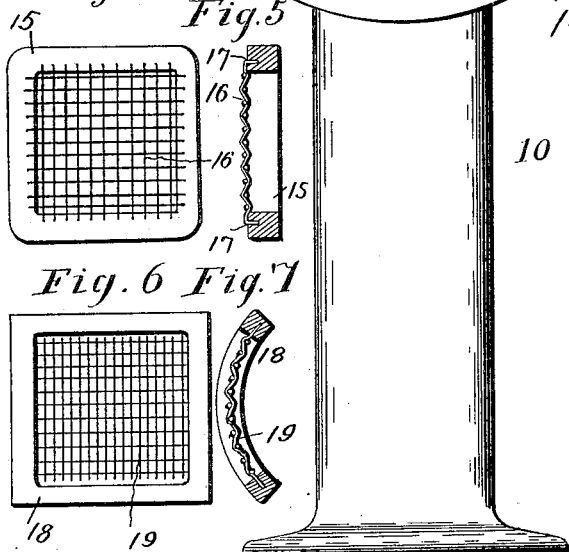
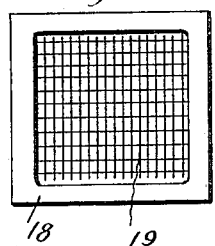
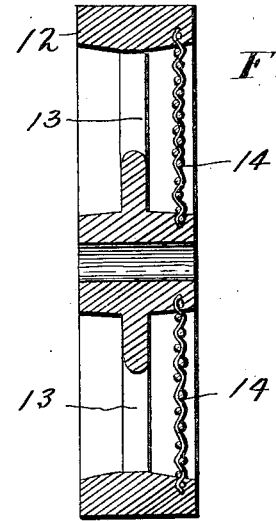
WITNESSES
INVENTOR

UNITED STATES PATENT OFFICE.

OBERLIN SMITH, OF BRIDGETON, NEW JERSEY.

GUARD FOR WHEELS.

1,130,207.   Specification of Letters Patent.   Patented Mar. 2, 1915.

Application filed May 14, 1913. Serial No. 767,617.

*To all whom it may concern:*

Be it known that I, OBERLIN SMITH, of Bridgeton, in the county of Cumberland, and in the State of New Jersey, have invented a certain new and useful Improvement in Guards for Wheels, and do hereby declare that the following is a full, clear, and exact description thereof.

The fly wheels of power presses are ordinarily of spoke-type, that is to say, the hub and rim are connected by spokes so that there are holes or spaces extending through the wheel from side to side. These holes are a source of danger in that the hand or arm may be thrust through them carelessly or unwittingly, or intentionally and under conditions of apparent safety, and serious hurt be caused. Of course, other wheels than fly wheels, such as pulleys and gears present the same conditions of danger, and, indeed, other parts of machinery present or have holes or openings which affording access of the hand or arm are thus a source of danger.

The object of my invention is to provide a guard for these holes, or spaces, which will be inexpensive, immovably secured in place against accidental dislodgment, be free from any attaching means that can work or jar loose from the revolution of the wheel when applied to a wheel, and so would make it a possible source of harm instead of a protection against harm, be light in weight and not unattractive in appearance, and to these ends my invention consists in the construction substantially as hereinafter specified and claimed.

In the accompanying drawings—Figure 1 is an elevation of a power press having its fly wheel provided with a guard that embodies one form of my invention; Fig. 2 is a vertical section through the wheel; Fig. 3 is a like section of a fly wheel illustrating a different embodiment of my invention; Fig. 4 is an elevation of a stationary framework member having an opening that is provided with a safety guard in accordance with my invention; Fig. 5 is a section through the same; Fig. 6 is an elevation of a different form of the framework embodying my invention; and Fig. 7 is a section through the same.

In Fig. 1 of the drawing 10 designates the frame of a power press, 11 the ram-actuating or crank shaft, and 12 the spoked fly wheel of usual construction. In the form of my invention shown in Figs. 1 and 2, the spaces or holes between the spokes 13, are covered by pieces 14 of heavy wire cloth, each of which has a contour corresponding to the outline of the space to be covered and which is slightly larger than said space, so that, being inserted in the parting of the two mold flasks in which the iron wheel is cast, the edge of the piece will be embedded in the cast wheel, and thus the guard securely, and yet very simply, fixed to the wheel. The substantially triangular form of the guards enables them to be cut from a strip of wire cloth with great economy of material, by cutting, so that the wide and narrow ends of adjacent pieces will be contiguous.

Although because requiring a minimum of material, the separate guard for each space is desirable, yet, as shown in Fig. 3, my invention contemplates the use of a complete circular sheet 14, which has a central hole to fit over the wheel hub, and is secured to the rim and to the hub by having its outer and inner edges slightly embedded in the same in the molding operation.

In Figs. 4 to 7, I illustrate my invention as applied to a stationary member of the framework of a machine. As shown in Figs. 4 and 5, said member 15 is in the form of a flat frame and the wire cloth 16 to cover the same has its edges 17 bent inward at right angles, say for half an inch or an inch, so that in casting the frame said inturned edges are embedded therein. The manner of attaching the wire cloth, shown in Figs. 4 and 5, by bending the edges of the sheet inward at right angles, is also applicable in the case of pulleys or other wheels.

As shown in Figs. 6 and 7, the frame 18 has a curvilinear form in cross section and the sheet of wire cloth 19 has its edges embedded in the frame 18 when the latter is cast.

It will be observed that in all forms of my invention, the manner of attaching the guard to the wheel, or other member, is by embedding the edges of the wire cloth in the member by the casting operation.

The wire cloth besides being light and not obstructing vision, has the further advantage that, in casting, the metal of the pulley, or other member, interlocks with the meshes formed by the cloth.

Having thus described my invention what I claim is—

1. The combination of a machine member or element having an opening through it and made of cast metal, and a guard for the opening that consists of wire cloth, the edge of which is embedded in the portion of the member contiguous to the opening.

2. A cast metal wheel in combination with a guard embedded at its edges in the wheel, said guard being of wire cloth.

3. A cast metal wheel, comprising a rim and a hub, the wheel having openings between the rim and the hub, in combination with a guard for each of the openings consisting of wire cloth all of whose edges are embedded in the wheel.

In testimony that I claim the foregoing I have hereunto set my hand.

OBERLIN SMITH.

Witnesses:
NORA F. DUFFIELD,
HUGH L. REEVES.